United States Patent
Gregoire et al.

(10) Patent No.: US 11,681,063 B2
(45) Date of Patent: Jun. 20, 2023

(54) MULTI-FUNCTION ACQUISITION DEVICE AND OPERATING METHOD

(71) Applicant: SERCEL, Carquefou (FR)

(72) Inventors: Christian Gregoire, Carquefou (FR);
Freddy Excoffier, Carquefou (FR);
Philippe Ribalet, Carquefou (FR);
Jacques Thebaud, Carquefou (FR)

(73) Assignee: SERCEL, Carquefou (FR)

( * ) Notice: Subject to any disclaimer, the term of this patent is extended or adjusted under 35 U.S.C. 154(b) by 882 days.

(21) Appl. No.: 16/569,846

(22) Filed: Sep. 13, 2019

(65) Prior Publication Data

US 2021/0080599 A1    Mar. 18, 2021

(51) Int. Cl.
*G01V 1/16* (2006.01)
*H02J 7/00* (2006.01)

(52) U.S. Cl.
CPC ............ *G01V 1/164* (2013.01); *H02J 7/0045* (2013.01); *H04Q 2209/30* (2013.01); *H04Q 2209/88* (2013.01)

(58) Field of Classification Search
CPC ... G01V 1/164; H02J 7/0045; H04Q 2209/30; H04Q 2209/88
See application file for complete search history.

(56) References Cited

U.S. PATENT DOCUMENTS

| | | | |
|---|---|---|---|
| 5,253,223 A * | 10/1993 | Svenning | G01V 1/16 367/15 |
| 7,195,505 B1 | 3/2007 | Becker | |
| 7,668,044 B2 | 2/2010 | Brinkman et al. | |
| 7,725,264 B2 | 5/2010 | Pavel et al. | |
| 8,547,796 B2 | 10/2013 | Wilcox et al. | |
| 2005/0134003 A1 | 6/2005 | Bryde | |
| 2005/0246137 A1 | 11/2005 | Brinkman et al. | |
| 2005/0276162 A1* | 12/2005 | Brinkmann | G01V 1/40 367/77 |
| 2009/0086797 A1 | 4/2009 | Wilcox | |

(Continued)

FOREIGN PATENT DOCUMENTS

| | | |
|---|---|---|
| CA | 3075873 | 3/2019 |
| CN | 101 944 694 | 1/2011 |

(Continued)

OTHER PUBLICATIONS

U.S. Advisory Action dated Dec. 1, 2020.

(Continued)

*Primary Examiner* — Amine Benlagsir
(74) *Attorney, Agent, or Firm* — Ipsilon USA, LLP

(57) ABSTRACT

A multi-function acquisition device comprising a connector having two connection terminals, and an electronic circuit that comprises an acquisition circuit configured for enabling the digital conversion of analogic signals from a sensor, and the memorization of the digitized signals in a memory; a harvesting circuit configured for enabling the transmission of data stored in the memory to a harvesting device; a charging circuit configured for enabling the charging of a battery with the power provided by a powering device. A control unit controls the activation of the acquisition circuit, the activation of the harvesting circuit, and the activation of the charging circuit.

20 Claims, 4 Drawing Sheets

(56) References Cited

U.S. PATENT DOCUMENTS

| | | | |
|---|---|---|---|
| 2009/0093687 A1* | 4/2009 | Telfort | A61B 5/0215 |
| | | | 600/300 |
| 2012/0008460 A1 | 1/2012 | Crice | |
| 2013/0336092 A1 | 12/2013 | Pennec et al. | |
| 2014/0126327 A1 | 5/2014 | Swier et al. | |
| 2014/0126329 A1* | 5/2014 | Guyton | G01V 1/247 |
| | | | 367/76 |
| 2014/0219051 A1 | 8/2014 | Pavel | |
| 2015/0171793 A1* | 6/2015 | Regier | H03F 1/26 |
| | | | 330/251 |
| 2015/0355610 A1 | 12/2015 | Petrocy | |
| 2016/0011324 A1 | 1/2016 | Hamon et al. | |
| 2016/0224057 A1 | 8/2016 | Ecker | |
| 2017/0299740 A1 | 10/2017 | Guyton | |
| 2018/0341033 A1* | 11/2018 | Olivier | G01V 1/3852 |
| 2020/0241156 A1 | 7/2020 | Contant et al. | |
| 2020/0318462 A1* | 10/2020 | Ross | H02M 3/33569 |
| 2021/0063483 A1* | 3/2021 | Hermann | G01R 31/3167 |

FOREIGN PATENT DOCUMENTS

| | | |
|---|---|---|
| EP | 1995609 | 11/2008 |
| FR | 2981212 | 11/2013 |

OTHER PUBLICATIONS

International search report dated Dec. 22, 2020.
International Search Report dated Mar. 11, 2021.
U.S. Office Action dated Feb. 6, 2020.
International search report dated Dec. 18, 2020.
International partial search report dated Jan. 12, 2021.

* cited by examiner

MULTI-FUNCTION ACQUISITION DEVICE AND OPERATING METHOD

TECHNICAL FIELD

Embodiments of the subject matter disclosed herein generally relate to the acquisition of signals from a sensor connected to a device, the harvesting of data from said device, and the charging of a battery that powers the device.

DISCUSSION OF THE BACKGROUND

It is sought more particularly here below in this document to describe problems existing in the field of seismic data acquisition for prospecting industry. The invention of course is not limited to this particular field of application but is of interest for any technique that has to cope with closely related or similar issues and problems.

Seismic data acquisition and processing generate a profile (image) of the geophysical structure (subsurface) under the floor.

While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

The operations of acquiring seismic data on site conventionally use networks of seismic sensors, like geophones.

The seismic method is based on an analysis of reflected seismic waves.

In order to collect geophysical data in a land-based (ground) environment, one or more seismic sources in contact with the ground are activated to propagate series of omnidirectional seismic waves. The series of waves reflected by the strata of the subsurface are then detected by sensors, such as geophones, which generate a signal characterizing the reflection of the waves on the geological interfaces of the subsurface.

When analog sensors (also referred to as "geophones") are used, they are generally interconnected by cables to form clusters referred to as "strings of geophones".

The strings of geophones are connected to acquisition devices which perform an analog to digital conversion of the signals from the strings of geophones.

Some seismic acquisition use autonomous nodes. Some examples of autonomous seismic acquisition nodes are described in US patent applications US2009/086797, US2016/011324 and U.S. Pat. No. 8,547,796, the entire content of which are incorporated herein by reference.

In this case, each acquisition device is powered by a battery.

The acquisition device can store the digitized acquired signals in a memory of the device and the corresponding data can be harvested later on by connecting the acquisition device into a rack, or docking station, that includes a harvesting module for receiving the data from the memory of the acquisition device.

The rack may also have a powering module enabling to charge the battery of the acquisition device when said acquisition device is connected into the rack.

Other configurations than rack or docking stations exist for harvesting data and/or charging the battery, like e.g. extracting said battery from the node, or downloading the memory of each node.

As presently sometimes used, the rack is connected to the acquisition device by plugging a connector of the rack to a connector (or pins of the connector) of the acquisition device used for operating the harvesting or powering function, that differs from the connector (or pins of the connector) of the acquisition device used for connecting the sensor to operate the acquisition function.

In other words, with such known acquisition device, management of the acquisition and harvesting/powering functions implies to use different connectors or different set of pins to manage charging, harvesting and sensor acquisition.

Thus, for operating an acquisition with the known acquisition device, a sensor is connected to a connector of the acquisition device with dedicated pins of the connector used for acquisition of signals of the sensor, while for operating a harvesting or charging function with said known acquisition device, the rack has to be connected to another connector of said known acquisition device with dedicated pins used for harvesting the data or charging the battery.

It can be understood that the use of dedicated connectors or pins for operating different functions on known acquisition device is fastidious, with a risk of connection error, while the multiplicity of connectors or dedicated pins is costly.

There is thus a need to provide a new device and corresponding operating method, that enables to overcome at least part of the drawbacks of the known acquisition device.

SUMMARY

According to an embodiment, there is a multi-function acquisition device comprising a casing with a connector having two connection terminals, adapted for electrically connecting a complementary connector of a second device, and an electronic circuit located in said casing and connected to said two connection terminals, wherein said electronic circuit comprises:
an acquisition circuit configured for enabling the digital conversion of analogic signals from a sensor as second device, and the memorization of the digitized signals in a memory, when said sensor is connected to said two connection terminals;
a harvesting circuit configured for enabling the transmission of data stored in the memory to a harvesting device as second device, when said harvesting device is connected to the two connection terminals;
a charging circuit configured for enabling the charging of a battery located in said casing with the power provided by a powering device as second device, when said powering device is connected to the two connection terminals, and
a control unit configured to control the activation of the acquisition circuit, the activation of the harvesting circuit, and the activation of the charging circuit.

According to a particular aspect, the electronic circuit includes a switch system to selectively electrically connect the acquisition circuit or the harvesting circuit to the two connection terminals of the connector.

According to a particular aspect, the multi-function acquisition device comprises a voltage detecting system configured to detect a voltage between the two connection terminals that is superior to a first threshold value, and wherein the control unit is configured to control the charging circuit in function of said voltage.

According to a particular aspect, the control unit is configured to command the switch system to electrically connect the acquisition circuit to the two connection terminals of the connector, when the voltage between the two connection terminals is inferior to said first threshold value.

According to a particular aspect, the control unit is configured to command the switch system to electrically connect the harvesting circuit to the two connection terminals of the connector, when the voltage between the two connection terminals is superior or equal to said first threshold value.

According to a particular aspect, the control unit is configured to, when the voltage detecting system has detected a voltage superior or equal to the first threshold, said detection being indicative of a powering device connected to the connector,
communicate with the powering device via the two connection terminals to check that the powering device is able to provide a voltage superior or equal to a second threshold, that is superior to the first threshold, and
in function of the result of the checking, command the closing of the charging circuit to have the battery electrically connected to the two connection terminals via the charging circuit.

According to a particular aspect, the acquisition circuit includes an analog to digital converter.

According to a particular aspect, the harvesting circuit comprises a low frequency filter including capacitances for filtering an input voltage applied to the two connection terminals to get a reduced voltage in the harvesting circuit.

According to a particular aspect, the charging circuit comprises a high frequency filter that includes inductances.

According to a particular aspect, the charging circuit is positioned between the two connection terminals and the voltage detecting system.

According to an embodiment, there is an acquisition unit comprising a multi-function acquisition device as proposed above, and a sensor connected to the two connection terminals of said multi-function acquisition device, wherein the acquisition circuit is activated, while the harvesting circuit and the charging circuit are inactivated.

According to a particular aspect, said sensor is a seismic sensor.

According to an embodiment, there is a harvesting system comprising a multi-function acquisition device as proposed above, and a harvesting device connected to the two connection terminals of said multi-function acquisition device, wherein the harvesting circuit is activated.

According to a particular feature, the harvesting device is a docking station that includes a harvesting module.

According to a particular feature, the harvesting circuit including a first data transmitter, a first data receiver, and a first driving unit configured for driving activation of said first data transmitter and said first data receiver, and
the harvesting device including a second data transmitter, a second data receiver, and a second driving unit configured for driving activation of said second data transmitter and said second data receiver,
wherein, for transmitting data from the harvesting circuit of the multi-function acquisition device to the harvesting device,
the first driving unit of the harvesting circuit of the multi-function acquisition device is configured to maintain the first data transmitter activated during a period of time after the data is transmitted by the first transmitter and received by the second receiver, and
wherein the second driving unit of the harvesting device is configured to activate the second transmitter at a time included in said period of time for which the first transmitter of the harvesting circuit is maintained activated.

According to an embodiment, there is a charging system comprising a multi-function acquisition device as proposed above, and a powering device connected to the two connection terminals of said multi-function acquisition device, wherein the charging circuit is activated.

According to a particular aspect, the powering device is a docking station that includes a powering module.

According to an embodiment, there is a charging and harvesting system comprising a multi-function acquisition device as proposed above, and a powering and harvesting device connected to the two connection terminals of said multi-function acquisition device, wherein the harvesting circuit and the charging circuit are activated.

According to an embodiment, there is a method for operating a multi-function acquisition device being as proposed above, said method comprising:
connecting a second device to the two connection terminals of the multi-function acquisition device;
determining with the control unit of the multi-function acquisition device at least one electrical feature between the two connection terminals;
activating with the control unit the acquisition circuit or at least one of the harvesting circuit and the charging circuit, in function of the at least one electrical feature determined.

According to a particular aspect, said second device being a sensor, the acquisition circuit is activated, and the harvesting circuit and the charging circuit are disactivated.

LIST OF FIGURES

The invention is described in more detail below by way of the figures that show embodiments of the invention.

Figure 1:
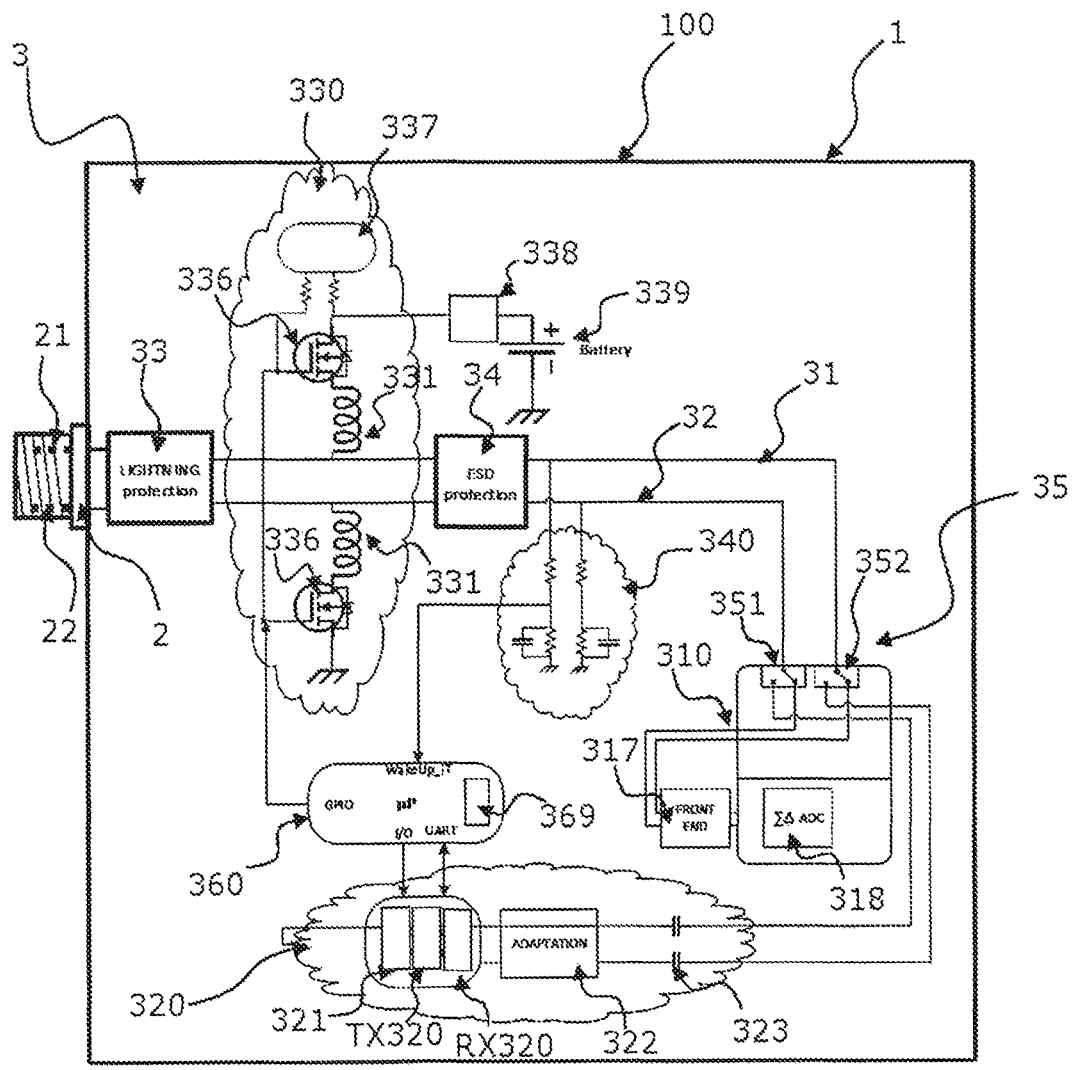
FIG. 1 is a schematic view of a multi-function acquisition device according to an embodiment of the invention, said multi-function acquisition device having a connector to connect a second device to said multi-function acquisition device.
Figure 3:
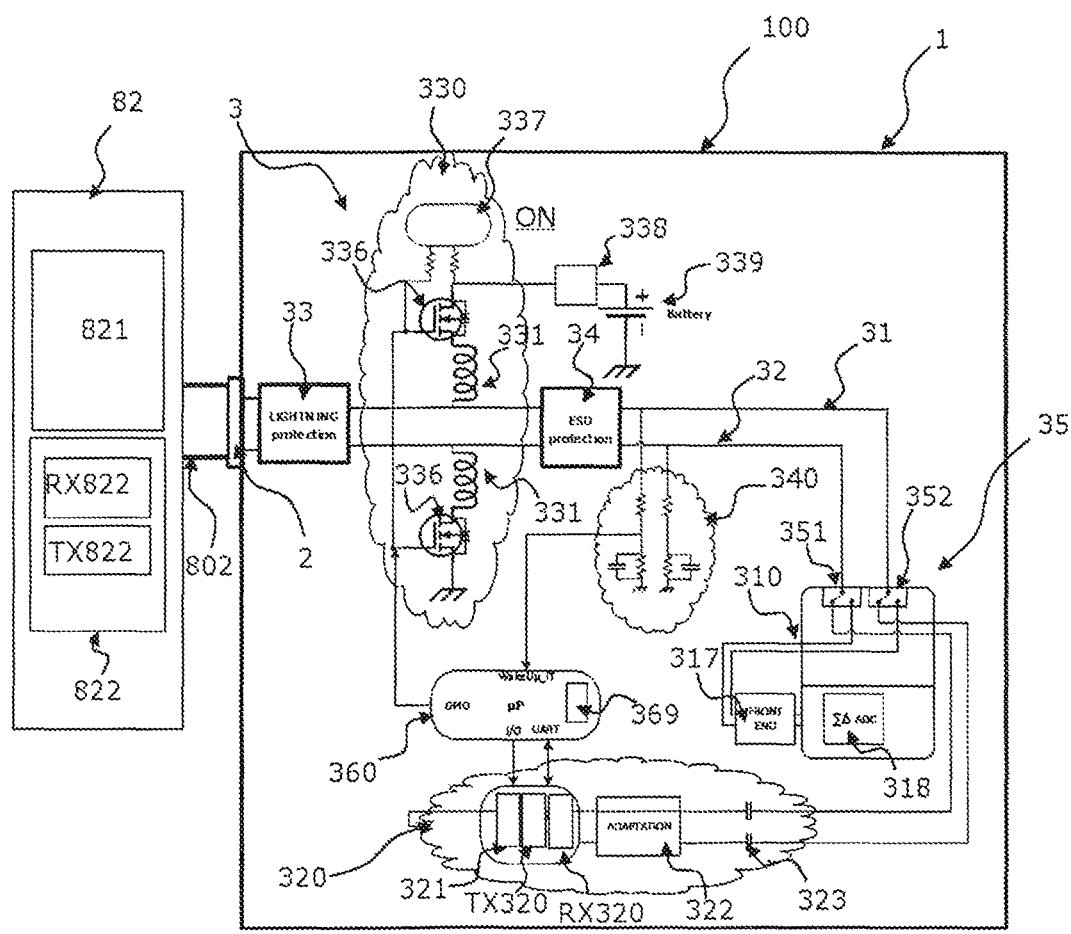

FIG. 3 is a schematic view of the multi-function acquisition device of FIG. 1, in a configuration wherein a rack is connected to the connector of the multi-function acquisition device, said rack having a harvesting module and a powering module, in view of harvesting data from the multi-function acquisition device and/or powering a charging circuit to charge a battery of the multi-function acquisition device.

Figure 4:
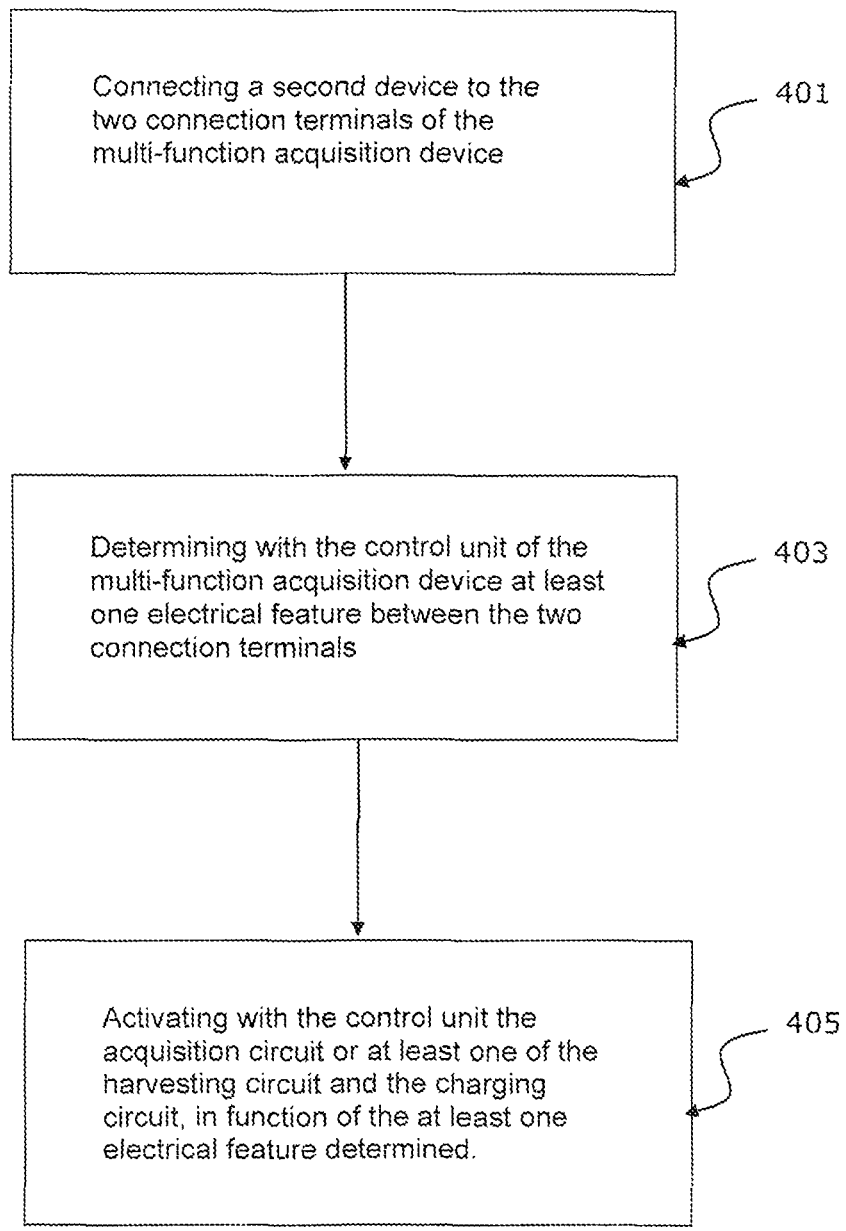

FIG. 4 is a diagram showing steps of a method for operating a multi-function acquisition device, such as the one of FIG. 1, according to an embodiment of the invention.

DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

FIG. 1 illustrates a multi-function acquisition device 1 according to an embodiment. Preferably, the multi-function acquisition device is as described in US Patent application titled "Wireless Seismic Acquisition Node and Method", filed by the applicant the same day as present patent application, and the content of which is incorporated herein by reference.

Figure 2:
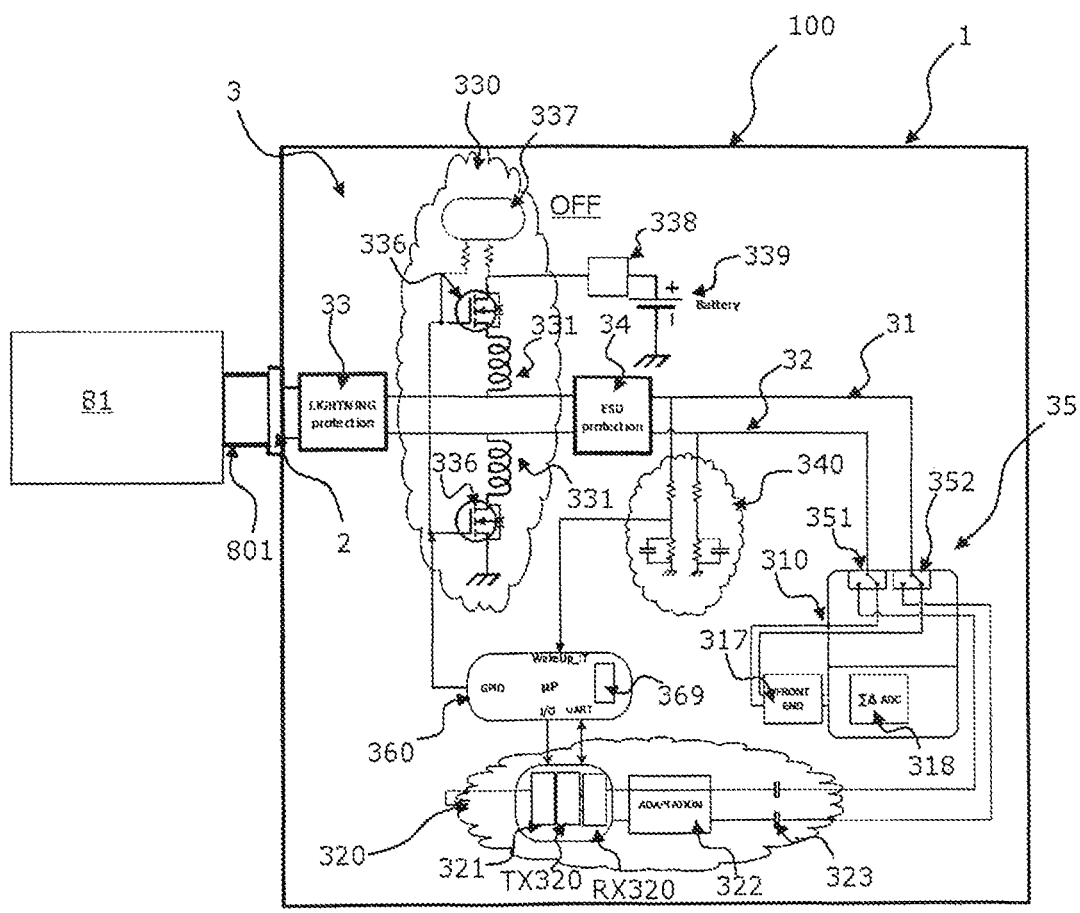
FIG. 2 is a schematic view of the multi-function acquisition device of FIG. 1, in a configuration wherein a sensor is connected to the connector of the multi-function acquisition device in view of acquiring signals from the sensor with an acquisition circuit of the multi-function acquisition device.

As detailed hereafter in reference to FIG. 2, the multi-function acquisition device 1 enables to acquire signals from a sensor 81 when the sensor 81 is connected to the multi-function acquisition device 1. The sensor 81 can be a geophone or a series of geophones, also referred to as a string of geophones.

The multi-function acquisition device 1 enables also to harvest data from the multi-function acquisition device 1. In particular, data corresponding to signals acquired from the sensor 81, digitized and memorized in a memory 369, can be harvested by being read from said memory 369 and transmitted to a harvesting device connected to the multi-function acquisition device 1. The memory 369 can be included in a control unit 360 of the multi-function acquisition device 1 as detailed hereafter. The harvesting device can be a rack 82, also referred to as a docking station, that comprises a harvesting module 822 as illustrated at FIG. 3.

A battery 339 that powers the multi-function acquisition device 1 can also be charged through the multi-function acquisition device 1 when a powering device is connected to said multi-function acquisition device 1. The powering device can be a rack 82 that comprises a powering module 821.

Advantageously, the same rack is used as harvesting and powering devices. It is preferably configured as disclosed in US patent application titled "Docking Station for Wireless Seismic Acquisition Nodes" and filed by the applicant the same day as present patent application, and the content of which is incorporated herein by reference.

These functions of acquisition, harvesting, and charging are available through one connector 2 of the multi-function acquisition device 1 to which a second device is intended to be connected. In particular, depending of the desired function(s) to be operated, said second device can be a sensor 81 as illustrated at FIG. 2, or a powering device and/or a harvesting device. Said second device can also be a device, such as the rack 82, that combines both powering and harvesting functions as illustrated at FIG. 3.

In other words, the same connector 2 of the multi-function acquisition device 1 is used for proceeding to acquisition of signals of a sensor 81 connected to the multi-function acquisition device 1, or for harvesting data from the multi-function acquisition device 1 into a harvesting device connected to the multi-function device and/or for charging the battery 339 via a powering device connected to the multi-function acquisition device 1.

In particular sensor 81 has a connector 801 with connection terminals adapted to be electrically connected to the connection terminals 21, 22 of the connector 2 of the multi-function acquisition device 1. Rack 82 also has a connector 802 with connection terminals adapted to be electrically connected to the connection terminals 21, 22 of the connector 2 of the multi-function acquisition device 1. The harvesting module 822 is configured to be able to transmit/receive signals on the connection terminals 21, 22 of the connector 2 when the multi-function acquisition device 1 is connected to the rack 82. Also, the powering module 821 is configured to be able to transmit/receive signals, including transmit power, on the connection terminals 21, 22 of the connector 2 when the multi-function acquisition device 1 is connected to the rack 82.

The powering module 821 can comprise an electrical power source to provide power to a charging circuit of the multi-function acquisition device 1 to power the battery 339. According to a particular aspect, the powering module 821 also includes a transmitter and a receiver to communicate with the control unit 360 of the acquisition device 1. Communication can be used for instance for enabling the control unit 360 to request information from the powering module and/or request the powering module to provide power to the battery.

The harvesting module 822 of the rack 82 includes a data transmitter TX822 and a data receiver RX822 that enable to communicate via the two pins 21, 22 with the control unit 360 and with the harvesting circuit 320 of the multi-function acquisition device 1, when the harvesting circuit 320 is electrically connected to the two pins 21, 22. According to a particular aspect, the communication between the harvesting module 822 of the rack 82 and the harvesting circuit of the multi-function acquisition device 1 is half-duplex and is operated by differential signaling. The harvesting module 822 can receive data from the memory 369 of the multi-function acquisition device 1 and store received data in a memory that can be included in the rack 82 or that can be external to the rack.

The harvesting module 822 also includes a driving unit configured for driving activation of said data transmitter TX822 and said data receiver RX822.

According to embodiments and as detailed hereafter, the multi-function acquisition device 1 can be, with one connector 2 having two connection terminals 21, 22, selectively:
connected to a sensor to acquire sensor signals by digitizing and memorizing signals provided by the sensor,
or connected to a powering and/or harvesting device for charging the battery that powers the multi-function acquisition device 1 and/or harvesting the data memorized during previous acquisition.

The multi-function acquisition device 1 can be an Analogic Field Unit, also referred to as AFU, used for seismic operations. The multi-function acquisition device 1 can thus be a seismic node. The seismic operation can use a seismic acquisition network that includes a plurality of such multi-function acquisition devices that form nodes of the network.

According to preferred embodiments and as illustrated at FIG. 1, the connector 2 has only two connection terminals 21, 22, also referred to as pins. The connector is preferably a KCK2 standard connector. KCK2 standard connector is usually used to plug a geophone (or string of geophones) to an acquisition unit provided with such a connector. Such a KCK2 standard connector can be used to connect a geophone or string or geophone as well for an autonomous node or a wire (cabled) node connected to the central unit via a plurality of cables, as well described in the French Patent FR2981212, the entire content of which are incorporated herein by reference.

Each pin 21, 22 of the connector 2 is electronically linked with a wire 31, 32 (conductive line) of an electronic circuit 3 of the multi-function acquisition device 1.

As detailed hereafter, the electronic circuit 3 of the multi-function acquisition device 1 includes a plurality of circuits that are electrically linked or linkable to the wires 31, 32 to operate in cooperation with the second device (such as a sensor or powering and/or harvesting device as discussed above), said second device having a connector comprising two connection terminals connectable to the pins 21, 22 of the connector 2 of the multi-function acquisition device.

The electronic circuit 3 is housed in a casing 100. The casing is provided with said connector 2. The electronic circuit 3 can comprise a printed circuit board that includes all or parts of the below detailed circuits.

The electronic circuit 3 comprises an acquisition circuit 310 that enables the digital conversion of analogic signals coming from the sensor 81 when said sensor is connected to connector 2.

The Acquisition Circuit

The acquisition circuit 310 comprises an analog to digital converter 318 that can be a sigma-delta converter. The acquisition circuit 310 further includes an analog front-end 317 for conditioning the analogic signals provided by the sensor 81, before being processed by the analog to digital converter 318.

The acquisition circuit 310 comprises two wires (conductive lines) that can be connected or disconnected with the wires 31, 32 that are electrically linked to the pins 21, 22. A first wire of the acquisition circuit 310 can thus be connected/disconnected with the wire 31 via a first switch 351, while a second wire of the acquisition circuit 310 can be connected/disconnected with the wire 32 via a second switch 352. In other words, the multi-function acquisition device 1 includes a switch system 35 (including first and second switches 351 and 352) that enables to electrically connected/disconnect the acquisition circuit 310 with the two pins 21, 22 of the connector 2.

The Harvesting Circuit

The electronic circuit 3 also comprises a harvesting circuit 320 that enables, in cooperation with the control unit 360, the transmission of data stored in the memory 369 to the harvesting device, when said harvesting device is connected to connector 2 of the multi-function acquisition device 1. The control unit 360 manages access to memory 369 and communication with the harvesting circuit 320.

As explained above, the harvesting device can be formed by a rack in which said multi-function acquisition device can be introduced and connected by the connector 2 to a corresponding connector of the rack.

Similarly to the acquisition circuit, the harvesting circuit 320 has a first wire (conductive line) that can be connected/disconnected to the wire 31 via the switch 351 and a second wire (conductive line) that can be connected/disconnected to the wire 32 via the switch 352. In particular the connection of the acquisition circuit 310 or the harvesting circuit 320 to the two pins 21, 22 is done via the electrically conductive wires 31, 32 that are connected to the two pins 21, 22 of the connector 2, and to the first and second switches 351 of the switch system 35.

As illustrated at FIGS. 1 and 2, the switch system 35 has a first position wherein the harvesting circuit 320 is electrically connected to the two pins 21, 22 via the electrically conductive wires 31, 32, while the acquisition circuit 310 is isolated from the two pins 21, 22.

The switch system 35 has also a second position wherein the acquisition circuit 310 is electrically connected to the two pins 21, 22 via the electrically conductive wires 31, 32, while the harvesting circuit 320 is isolated from the two pins 21, 22.

Positions of the switch system 35 can be controlled by the control unit 360.

According to a particular aspect, by default, the switch system 35 is in the first position according to which the acquisition circuit 310 is electrically connected to the pins 21, 22, until the control unit commands the switch system 35 to take the second position.

The harvesting circuit 320 includes a data transmitter TX320, a data receiver RX320, and a driving unit 321 configured for driving activation of said data transmitter TX320 and said data receiver RX320.

The harvesting circuit 320 comprises a low frequency filter including capacitances 323 for filtering an input voltage applied to the two pins 21, 22. The low frequency filter thus enables to get a reduced voltage in the harvesting circuit 320. Indeed, when connected to the multi-function acquisition device 1, the harvesting device (that can be the rack 82), provides power to the two pins 21, 22 (and thus to the wires 31, 32) with a voltage of 5 volts for instance.

As illustrated at FIGS. 1 to 3, each of the two wires of the harvesting circuit 320 is provided with a capacitance 323. The value of each capacitance is for instance 1 µF.

The input voltage applied by the rack 82 to the two pins includes an AC component and a DC component. The reduced voltage obtained by the low frequency filter is the AC voltage of the input voltage.

As illustrated in FIGS. 1 to 3, the harvesting circuit 320 includes an adaptation circuit 322 whose role is to modify transmission signals shape in accordance of a template to be able to transmit data with reduced risk of errors.

The Charging Circuit

The multi-function acquisition device 1 includes a charging circuit 330 that enables the charging of the battery 339 with the power provided by the powering device, when said powering device is connected to the two pins 21, 22 of said multi-function device 1.

In the embodiments of FIGS. 1 to 3, the charging circuit 330 includes a charger 338 for charging the battery 339. In a variant, the charger could be an external charger. Having the charger 338 included in the charging circuit enables to charge the battery 339 at high current, but it is possible to charge the battery at lower current with an external charger.

The charging circuit 330 comprises a high frequency filter that includes inductances 331. The high frequency filter is used for filtering the AC component of the input voltage provided by the rack 82 and keep the DC component of the input voltage to power the charging circuit 320. The value of each inductance is for instance 47 µH.

The charging circuit 330 includes transistors 336, preferably MOS transistors, that can be driven by the control unit 360 to switch between an OFF state and an ON state. In the OFF state of the transistors 336, the charging circuit is inactivated. In the OFF state transistors 336 correspond to open interrupters preventing electrical current to pass from the wires 31, 32 to the battery 339 (or charger 338). In other words, in the OFF state of the transistors 336, the charging circuit 330 is open.

By default, i.e. without being commanded by the control unit 360, the transistors 336 are in the OFF state. To switch the transistors 336 to ON state, the control unit 360 is configured to apply a voltage (superior to a threshold value) to the gate of each transistor 336 to let the current flow between the sources of the transistors 336, that are connected to the wires 31, 32 and the battery 339.

In the ON state, transistors 336 correspond to closed interrupters authorizing electrical current to pass from the wires 31, 32 to the battery 339 (or charger 338). In other words, in the ON state of the transistors 336, the charging circuit is closed and considered as activated.

Preferably, the charging circuit 330 includes a device 337, referred to as a voltage pump, configured for maintaining the charging circuit 330 closed when the control unit 360 commands the closing of said charging circuit 330. In particular, the voltage pump applies a voltage, for instance 12 volts, to the gates of transistors 336 that maintains the transistors in the ON state.

In a variant of the charging circuit, wherein the transistors 336 could be absent, the switch system 35 could be designed to have a third position to connect the two conductive lines of the charging circuit to the two pins 21, 22. However, the charging circuit as illustrated in FIGS. 1 to 3 enable to operate the charging function and the harvesting function simultaneously, while a switch system with three positions would imply to select the circuit to activate depending of the function to operate.

The Voltage Detecting System

The electrical circuit 3 comprises a voltage detecting system 340 configured to detect a voltage between the two pins 21, 22 that is superior to a first threshold value.

The voltage detecting system 340 includes for each wire 31, 32 a tension divider bridge at the middle of which is connected an input of the control unit 360 to measure the corresponding voltage. The control unit includes a voltage detecting module that detect if the measured voltages correspond to a voltage applied to the pins that is superior to a threshold value. The voltage applied to the two pins by the rack 82 is a differential voltage.

The control unit 360 is configured to command the switch system 35 to electrically connect the harvesting circuit 320 to the two pins 21,22 of the connector 2, when the voltage between the two pins 21, 22 is superior or equal to said first threshold value Conversely, the control unit 360 is configured to command the switch system 35 to electrically connect the acquisition circuit 310 to the two pins 21,22 of the connector 2, when the voltage between the two pins 21, 22 is inferior to the first threshold value. When the voltage detecting system 340 detects a voltage superior or equal to the first threshold, this is indicative of a powering device (the rack 82 in the illustrated embodiments) connected to the connector 2.

Said first threshold value can be 3, 6 Volts for instance.

Arrangement of the Circuits

Preferably the charging circuit 330 is positioned as close as possible to the two pins 21, 22 to charge the battery with a current that is maximal and thus reduce the time for charging. As illustrated at FIGS. 1 to 3, the charging circuit 330 is positioned between the two pins 21, 22 and the voltage detecting system 340.

According to the embodiment illustrated at FIGS. 1 to 3, the voltage detecting system 340 is positioned between the two pins 21, 22 of the connector 2, on one hand, and the acquisition and harvesting circuits 310, 320, on the other hand.

According to a particular aspect, the electronic circuit 3 includes a lightning protection device 33, preferably positioned proximate to the two pins 21, 22 (compared to the other components of the electronic circuit 3).

Preferably, the electronic circuit 3 further includes an electrostatic discharge (ESD) protection device 34. The ESD protection device is preferably positioned between the charging circuit 330, on one hand, and the acquisition and harvesting circuits 310, 320, on the other hand, and as close as possible to the two pins 21, 22 of the connector 2.

The Control Unit

The control unit 360 of the multi-function acquisition device 1 enables to command the activation/deactivation of the acquisition circuit 310, the activation/deactivation of the harvesting circuit 320, and the activation/deactivation of the charging circuit 330. The control unit is for instance a microcontroller or microprocessor.

Acquisition circuit 310 is considered as activated when electrically connected to the two pins 21, 22, whether an acquisition is operating (running) or not. In other words, when the acquisition circuit 310 is activated (the acquisition circuit 310 is electrically connected to the pins 21, 22) an acquisition process can be operated with a sensor 81 connected to the pins 21, 22.

Similarly, harvesting circuit 320 is considered as activated when said harvesting circuit 320 is electrically connected to the two pins 21, 22, whether a harvesting process is ongoing or not. In other words, when the harvesting circuit 320 is activated (i.e. the harvesting circuit 320 is electrically connected to the pins 21, 22) a harvesting process can be operated with the harvesting device connected to the pins 21, 22.

The charging circuit is considered as activated when the charging circuit is closed so that current can flow from the two pins 21,22 of the connector 2 to the charger to charge the battery.

Thus, in the particular embodiment illustrated, the control unit 360 controls the connection/disconnection of the acquisition circuit 310 to the two pins 21,22 of the connector 2, controls the connection/disconnection of the harvesting circuit 320 to the two pins 21,22 of the connector, and controls the closed (activated) or open (inactivated) state of the charging circuit 330 connected to the two pins 21,22 to control the possibility of powering the charging circuit 330 with power applied to the two pins 21,22 by the powering device.

The switch system 35 enables to disconnect the harvesting circuit when the acquisition circuit is electrically connected to the two pins 21, 22 so that the acquisition, via the acquisition circuit, of the analogical signals coming from the sensor, is not perturbated by the components of the harvesting circuit. Furthermore, when the acquisition circuit is electrically connected to the two pins 21, 22, the charging circuit is OFF (inactivated). Thus, the acquisition function is not perturbated by the components of the charging circuit. In particular, having the charging circuit and the harvesting circuit each in an inactive state (OFF) when the acquisition circuit is activated (i.e. connected to the two pins 21, 22), prevent the perturbation of the acquisition by the resonant circuit, also referred to as to tuned circuit, that could be formed by capacitances 323 of the harvesting circuit and the inductances 331 of the charging circuit 330.

Method for Operating Acquisition, Harvesting, and Charging Functions

The multi-function acquisition device 1 proposed above can be used for operating different functions on the same two pins, i.e. without having to use dedicated pins for operating one function and other dedicated pins for operating another function.

Thus, the same connector 2 of the multi-function acquisition device 1 can be used with appropriate external device (sensor 81 or rack 82 for instance) for:
  acquiring signals from the sensor 81, or
  harvesting data from the multi-function acquisition device 1 and/or charging the battery 339.

An example of operating method of the multi-function acquisition device 1 is proposed in reference to FIG. 4. At step 401, an operator connects a second device, such as a sensor 81 or rack 82, to the two connection terminals of the multi-function acquisition device 1. At step 403, the control unit of the multi-function acquisition device determines at least one electrical feature, such as voltage and/or resistance, between the two connection terminals. At step 405, the control unit of the multi-function acquisition device activates the acquisition circuit or at least one of the harvesting circuit and the charging circuit, in function of the at least one electrical feature determined.

Particulars aspects are detailed below.

For operating an acquisition process, as illustrated at FIG. 2, an operator connects the connector 801 of the sensor 81 to the two pins 21, 22 of said multi-function acquisition device 1.

The control unit 360 of the multi-function acquisition device 1 detects that the sensor 81 is connected to the two pins 21, 22 of the connector 2 of the multi-function acquisition device 1 by detecting that the voltage and the resistance between the two pins 21, 22 are in a range of values indicative of a connection of said sensor 81. In particular the voltage measured is inferior to a threshold value for instance 3.6 Volts.

The control unit 360 then lets the switch system 35 in its default first position wherein the wires of the acquisition circuit 310 are electrically connected to the two pins 21, 22 via the wires 31, 32. According to another embodiment, the control unit 360 may also command that the switch system 35 take said first position.

Furthermore, as the detected voltage is inferior to said threshold value, the control unit 360 lets the charging circuit inactivated by letting the transistors 336 in the OFF state. According to another embodiment, the control unit 360 may also command the transistors 336 to be in the OFF state.

The control unit 360 can then drive the operating of the acquisition circuit to digitize the analogical signals provided on the two pins 21, 22 by the sensor 81 with the analog to digital converter 318 and memorize the digitized data in the memory 369.

As can be noted at FIG. 2, when the acquisition circuit 310 is activated (switch 35 being in the first position), the harvesting circuit 320 and the charging circuit 330 are inactivated. Thus, the acquisition is not perturbated by the harvesting circuit 320 and the charging circuit 330, and in particular is not perturbated by the LC circuit that could be formed by the capacitances and inductances of said harvesting circuit 320 and the charging circuit 330. Indeed, opening of the charging circuit and the harvesting circuit with regard to the two pins 21, 22 enables the acquisition circuit to acquire signals with low noise and with low distortion level.

In the embodiment illustrated at FIG. 3, for operating a charging and/or harvesting function, the operator connects the multi-function acquisition device 1 into the rack 82 that is provided with a connector 802 adapted to connect to the two pins 21, 22 of connector 2. In other words, the operator has, after acquisition process, disconnected the sensor 81 from the connector 2 of the multi-function acquisition device 1, and connected same connector 2 to the connector 802 of the rack 82.

The control unit 360 detects, via the voltage detection system 340, that an input voltage (for instance 5 volts), superior to said first threshold value (for instance 3, 6 volts), is applied on the two pins 21, 22 of the connector 2.

Then the control unit 360 communicates with the rack 82 via the two pins 21,22 to determine if the rack 82 is able to provide a voltage, for instance 5, 5 volts, superior or equal to a second threshold, that is superior to the first threshold. If the information provided by the rack to the control unit means that the rack 82 is able to provide the desired voltage and if the battery needs to be charged, the control unit 360 commands the transistor be in the ON State for the closing of the charging circuit 330 to have the battery 339 electrically connected to the two pins 21, 22.

Then the control unit 360 can request the powering module 821 to provide on the two pins 21, 22 a voltage, for instance 5, 5 Volts, that powers the closed charging circuit 330 so as to charge the battery 339.

Preferably, when detecting that the input voltage on the two pins 21, 22 is superior to said first threshold, the control unit 360 also commands the switch system 35 to be in the second position, where the acquisition circuit is disconnected while the harvesting circuit is connected to the two pins 21, 22 to enable simultaneous harvesting and powering functions.

According to a particular aspect, as explained above, the rack 82 and the harvesting circuit 320 communicate in half duplex mode. For harvesting data memorized in the memory 369, said data are passed from the memory 369 to the transmitter TX320 of harvesting circuit 320 in view of transmission of said data to the harvesting module 822 of the rack that is connected to the two pins 21, 22.

To reduce glitches in the data communication, both transmitter TX320 of the harvesting circuit 320 of the multi-function acquisition device 1 and transmitter TX822 of the harvesting module 822 of the rack 82 are initially activated (transmission enabled).

The harvesting module 822 activates receiver RX822 (and disactivate transmitter TX822) before transmission by said transmitter TX320 of the data to be harvested.

The first driving unit 321 of the harvesting circuit 320 of the multi-function acquisition device 1 maintains the data transmitter TX320 activated during a period of time after the data to be harvested has finished to be transmitted by the transmitter TX320 and received by the data receiver RX822 of the harvesting module 822 of the rack 82.

In parallel, the driving unit of the harvesting module 822 activates the transmitter TX822 at a time included in said period of time for which the first transmitter TX320 of the harvesting circuit 320 is maintained activated.

Then the harvesting circuit 320 of the multi-function acquisition device 1 enables its receiver RX320 (and disables transmitter TX320) to receive response data from the harvesting module 822.

Having thus both transmitters in the enabled state during a common period of time after having received/transmitted data and before transmitting/receiving data in response, enables to reduce the risk of glitches in the communicated data.

According to embodiments, the rack 82 can also be configured to test the sensor acquisition function by simulating a connection of a sensor to the two pins 21, 22. To this end, the rack 82 can commute a resistance that is equivalent to the one of a sensor. In that case of running an acquisition function test, the control unit 360 can command the opening of the charging circuit and the switch system 35 to be in the first position so as to connect the acquisition circuit to the two pins, while the rack provides signals corresponding to sensor signals to the two pins 21, 22 to simulate the presence of a sensor.

The above-described functions and steps related to the operating of the multi-function acquisition device may be implemented in the form of a computer program or via hardware components (e.g. programmable gate arrays). In particular, the functions and the steps performed by the control unit and circuits may be performed by sets of computer instructions or modules implemented by a processor or a controller or they may be performed by dedicated electronic components of the field-programmable gate array (FPGA) or application-specific integrated circuit (ASIC) type. It is also possible to combine computer parts and electronic parts.

The computer programs, or computer instructions, may be contained in program storage devices, e.g. computer-readable digital data storage media, or executable programs. The programs or instructions may also be executed from program storage peripherals.

The disclosed embodiments provide a multi-function acquisition device and corresponding method for operating acquisition, harvesting and/or charging functions. As explained above the multi-function acquisition device enables to manage the charging, communication/harvest and sensor acquisition functions are managed on the same two pins of a connector, while maintaining good quality acquisition. As a result the use of the acquisition device is simplified by enabling the device to be, via one single connection, connected to a sensor to acquire sensor signals or connected once to a rack to charge the battery, harvest data and/or test the unit with the same connector of the multi-function acquisition device as the one used for acquisition of sensor signals. This enable to reduce the cost and size of the acquisition device, with also reduced waterproofness risks because of the reduced number of connector or set of pins on the acquisition device compared to known acquisition devices.

It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A multi-function acquisition device comprising a casing with a connector having two connection terminals, adapted for electrically connecting a complementary connector of another device, and an electronic circuit located in said casing and connected to said two connection terminals, wherein said electronic circuit comprises:
   an acquisition circuit configured for enabling a digital conversion of analogic signals from a sensor, and a memorization of digitized signals in a memory, when said sensor is said another device that is connected to said two connection terminals;
   a harvesting circuit configured for enabling a transmission of data stored in the memory to a harvesting device, when said harvesting device is said another device that is connected to said two connection terminals;
   a charging circuit configured for enabling to charge a battery located in said casing with a power provided by a powering device, when said powering device is said another device that is connected to said two connection terminals, and
   a control unit configured to control an activation of the acquisition circuit, an activation of the harvesting circuit, and an activation of the charging circuit.

2. The multi-function acquisition device according to claim 1, wherein the electronic circuit includes a switch system to selectively electrically connect the acquisition circuit or the harvesting circuit to the two connection terminals of the connector.

3. The multi-function acquisition device according to claim 1, wherein the multi-function acquisition device comprises a voltage detecting system configured to detect a voltage between the two connection terminals that is superior to a first threshold value, and
   wherein the control unit is configured to control the charging circuit in function of said voltage.

4. The multi-function acquisition device according to claim 3, wherein, the electronic circuit including a switch system to selectively electrically connect the acquisition circuit or the harvesting circuit to the two connection terminals of the connector, the control unit is configured to command the switch system to electrically connect the acquisition circuit to the two connection terminals of the connector, when the voltage between the two connection terminals is inferior to said first threshold value.

5. The multi-function acquisition device according to claim 3, wherein, the electronic circuit including a switch system to selectively electrically connect the acquisition circuit or the harvesting circuit to the two connection terminals of the connector, the control unit is configured to command the switch system to electrically connect the harvesting circuit to the two connection terminals of the connector, when the voltage between the two connection terminals is superior or equal to said first threshold value.

6. The multi-function acquisition device according to claim 3, wherein the control unit is configured to, when the voltage detecting system has detected the voltage superior or equal to the first threshold, said detection of the voltage superior or equal to the first threshold being indicative of the powering device connected to the connector,
   communicate with the powering device via the two connection terminals to check that the powering device is able to provide the voltage superior or equal to a second threshold, that is superior to the first threshold, and
   in function of a result of the checking, command a closing of the charging circuit to have the battery electrically connected to the two connection terminals via the charging circuit.

7. The multi-function acquisition device according to claim 3, wherein the charging circuit is positioned between the two connection terminals and the voltage detecting system.

8. The multi-function acquisition device according to claim 1, wherein the acquisition circuit includes an analog to digital converter.

9. The multi-function acquisition device according to claim 1, wherein the harvesting circuit comprises a low frequency filter including capacitances for filtering an input voltage applied to the two connection terminals to get a reduced voltage in the harvesting circuit.

10. The multi-function acquisition device according to claim 1, wherein the charging circuit comprises a high frequency filter that includes inductances.

11. An acquisition unit comprising the multi-function acquisition device according to claim 1, wherein the sensor connected to the two connection terminals of said multi-function acquisition device, and the acquisition circuit is activated, while the harvesting circuit and the charging circuit are inactivated.

12. The acquisition unit according to claim 11, wherein said sensor is a seismic sensor.

13. A harvesting system comprising the multi-function acquisition device according to claim 1, wherein the harvesting device connected to the two connection terminals of said multi-function acquisition device, and the harvesting circuit is activated.

14. The harvesting system according to claim 13, wherein the harvesting device is a docking station that includes a harvesting module.

15. The harvesting system according to claim 13, wherein the harvesting circuit including a first data transmitter, a first data receiver, and a first driving unit configured for driving activation of said first data transmitter and said first data receiver, and the harvesting device including a second data transmitter, a second data receiver, and a second driving unit configured for driving activation of said second data transmitter and said second data receiver, wherein, for transmitting the data from the harvesting circuit of the multi-function acquisition device to the harvesting device, the first driving unit of the harvesting circuit of the multi-function acquisition device is configured to maintain the first data transmitter activated during a period of time after the data is transmitted by the first transmitter and received by the second receiver, and wherein the second driving unit of the harvesting device is configured to activate the second transmitter at a time included in said period of time for which the first transmitter of the harvesting circuit is maintained activated.

16. A charging system comprising the multi-function acquisition device according to claim 1, wherein the powering device connected to the two connection terminals of said multi-function acquisition device, and the charging circuit is activated.

17. The charging system according to claim 16, wherein the powering device is a docking station that includes a powering module.

18. A charging and harvesting system comprising the multi-function acquisition device according to claim 1, wherein the powering device and the harvesting device connected to the two connection terminals of said multi-function acquisition device, and the harvesting circuit and the charging circuit are activated.

19. A method for operating the multi-function acquisition device being according to claim 1, said method comprising:
  connecting said another device to the two connection terminals of the multi-function acquisition device;
  determining with the control unit of the multi-function acquisition device at least one electrical feature between the two connection terminals;
  activating with the control unit the acquisition circuit or at least one of the harvesting circuit and the charging circuit, in function of the determined at least one electrical feature.

20. The method according to claim 19, wherein, the acquisition circuit is activated, and the harvesting circuit and the charging circuit are disactivated.

* * * * *